US006961077B2

(12) United States Patent
Makino

(10) Patent No.: US 6,961,077 B2
(45) Date of Patent: Nov. 1, 2005

(54) MULTIBEAM LIGHT SOURCE

(75) Inventor: Hideyo Makino, Hachioji (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/725,756

(22) Filed: Nov. 30, 2000

(65) Prior Publication Data

US 2001/0020974 A1    Sep. 13, 2001

(30) Foreign Application Priority Data

Nov. 30, 1999  (JP) ............................... 11-341243
Oct. 11, 2000  (JP) ............................. 2000-310721
Oct. 30, 2000  (JP) ............................. 2000-331237

(51) Int. Cl.$^7$ ............................................. B41J 2/455
(52) U.S. Cl. ..................................................... 347/233
(58) Field of Search ............................. 347/233, 234, 347/235, 238, 241–242, 248, 250, 256–257, 347/244, 258, 130–131, 240, 251, 254, 134, 347/137, 245; 355/35; 250/578.1, 234; 372/50; 359/821; 362/259

(56) References Cited

U.S. PATENT DOCUMENTS

| 5,305,022 A |   | 4/1994 | Ota et al. ..................... 347/238 |
| 5,745,152 A |   | 4/1998 | Vincent et al. ............. 347/233 |
| 5,758,950 A | * | 6/1998 | Naoe et al. .................. 362/259 |
| 5,999,345 A | * | 12/1999 | Nakajima et al. ........... 359/821 |
| 6,133,566 A | * | 10/2000 | Yamaguchi .................. 250/234 |
| 6,144,685 A | * | 11/2000 | Iwasa et al. .................... 372/50 |
| 6,222,611 B1 | * | 4/2001 | Asada ........................... 355/35 |
| 6,232,999 B1 | * | 5/2001 | Kerr et al. .................. 347/241 |
| 6,268,877 B1 | * | 7/2001 | Sato et al. .................. 347/241 |

FOREIGN PATENT DOCUMENTS

| JP | 56-042248 |   | 4/1981 |   |
| JP | 08-136841 |   | 5/1996 |   |
| JP | 09-001861 |   | 1/1997 |   |
| JP | 09-026550 |   | 1/1997 |   |
| JP | 09-211350 |   | 8/1997 |   |
| JP | 9-236763 | * | 9/1997 | ............. B41J 2/44 |
| JP | 09-251137 |   | 9/1997 |   |
| JP | 10-039241 |   | 2/1998 |   |
| JP | 11230858 A | * | 8/1999 | .......... G01M 11/00 |

OTHER PUBLICATIONS

U.S. Appl. No. 09/725,756, filed Nov. 30, 2000, Makino.
U.S. Appl. No. 10/631,829, filed Aug. 1, 2003, Makino.
U.S. Appl. No. 10/756,355, filed Jan. 14, 2004, Makino.

* cited by examiner

*Primary Examiner*—Hai Pham
(74) *Attorney, Agent, or Firm*—Oblon, Spivak, McClelland, Maier & Neustadt, P.C.

(57) ABSTRACT

A multibeam light source for use in information recording, including a semiconductor laser array provided with a plurality of light emitting points in a single package, in which the plurality of light emitting points are positioned in linear relationship to one another and have an equidistant pitch so as to respectively emit laser beams to be simultaneously scanned over a recording substrate. The position of the semiconductor laser array is adjustable so as to satisfy the relation $\theta \leq \tan^{-1}\{1/(n-1)\}$, where the angle $\theta$ is defined by two straight lines, the one drawn perpendicular to the primary scanning direction on an image recording substrate and the other drawn through respective centers of the first and n-th laser beam spots formed on the image recording substrate by projecting laser beams emitted respectively from the plurality of light emitting points. As a result, increases in the speed and the density of the information recording are achieved through the formation of suitable laser beam diameters on the recording substrates. Also, excellent recorded images are achieved without visually recognized phase differences between laser beam spots.

1 Claim, 10 Drawing Sheets

MULTIBEAM LIGHT SOURCE

CROSS-REFERENCE TO RELATED APPLICATIONS

This application claims priority from Japanese Patent Application Nos. 11-341243, 2000-310721 and 2000-331237, filed with the Japanese Patent Office on Nov. 30, 1999, Oct. 11, 2000 and Oct. 30, 2000, respectively, the entire contents of which are hereby incorporated by reference.

BACKGROUND OF THE INVENTION

1. Field of the Invention

This invention relates to multibeam light sources for use in information recording systems such as a laser printer, digital duplication machine, facsimile apparatus and other similar systems, and more particularly to such multibeam light sources provided with semiconductor laser arrays.

2. Discussion of the Background

In many recent developments of laser printers, digital duplication machines and facsimile apparatuses, attention has been focused on the increase in speed and density of information recording. In order to achieve such improvement, a multibeam type light source has been developed which is provided with a plurality of laser beams simultaneously scanned over a recording substrate.

As an exemplary light source incorporated into a conventional multibeam light source, a semiconductor laser array is formed, including a plurality of light emitting points aligned on a single substrate, as disclosed in, for example, Japanese Laid-Open Publications Nos. 66-42248, 9-26550, 8-136841 and 9-261137.

Japanese Laid-Open Publication No. 8-136841 discloses a multibeam light source having two laser beams, in which the beam path for the first beam is brought to in coincidence with the center of a rotatable member, while the beam path for the second beam is displaced along the rotation of a rotatable member. As a result, the distance between these two beam paths (or the interval of recorded dot density) may suitably be adjusted.

Also, in the multibeam light source (in a laser recording apparatus) disclosed in Japanese Laid-Open Publication No. 9251137, the positions of light beams emitted from the laser array are detected with respect to the primary and secondary scanning directions for the recording apparatus using an index sensor. The index sensor is formed incorporating four constituent sensing portions, each being of rectangular shaped and corresponding to light beam detection (light receiving) area. Based on the result from detection, the laser array is then rotated to suitably adjust the interval, in the secondary scanning direction, of the plurality of light beams emitted from the laser array.

As shown in FIG. 12 of Japanese Laid-Open Publication No. 9251137, this light source includes a laser array 31 provided with four light emitting points E1~E4 formed on a chip. The chip is, in turn, capsulated in a holder 32 and rotatably incorporated into the light source. In addition, the light source is adjusted such that one of the light emitting points E1 at the end of the array be situated at the center of rotation for the laser array.

Also disclosed are multibeam light sources which are capable of scanning a plurality of laser beams, such as those described in Japanese Laid-Open Publications Nos. 10-39241, 9-251137, 9-1861 and 9-211350.

Japanese Laid-Open Publication No. 10-39241 discloses a multibeam light source capable of adjusting the rotation angle of its laser array depending on the selection of the scanning density. In contrast, a laser array included in the multibeam light source disclosed in the Japanese Laid-Open Publication No. 9-251137 may rotatably adjust the pitch along the secondary scanning direction of the array based on the results from detected beam position with respect to the primary and secondary scanning directions.

In addition, disclosed in the Japanese Laid-Open Publication No. 9-1861 is a multibeam light source with the capability of adjusting the phase difference along the primary scanning direction between a plurality of laser beams. Also disclosed in the Japanese Laid-Open Publication No. 9-211350 is a multibeam light source, in which dot writing positions may suitably be corrected even after transforming the beam pitch.

Several multibeam light sources are thus previously known, being provided with a plurality of light emitting points formed on a chip. However, the reduction of the distance between neighboring emitting points is limited so far to the order of, for example, 100 $\mu$m at least, because of appreciable interference effect between laser beams, although the distance may be decreased to equal to, or less than 20 $\mu$m, for example with the recent improvements in semiconductor manufacturing technology.

Multibeam light sources provided with a plurality of light emitting points formed with the thus decreased spacing are exemplified by those disclosed in Japanese Laid-Open Publications Nos. 9-251137, 9-211350 and 9-1861.

In these light sources, however, there are found several shortcomings. For example, the multibeam light source in laser recording apparatus disclosed in the Japanese Laid-Open Publication No. 9-251137 has to incorporate the aforementioned complicated sensors and beam detection algorithm, which result in the increase in machine costs.

For previous light sources, in addition, when the deviation of laser beam spots projected onto recording substrates is found to such an extent as to appreciably affect the quality of recorded images, correction for dot writing positions is often necessitated. These examples are found in the multibeam light sources disclosed in the Japanese Laid-Open Publications Nos. 9-211350 and 9-1861.

Furthermore, in the multibeam light source disclosed in Japanese Laid-Open Publication No. 8-136841, a beam path for the first beam is brought to coincide with the center of a rotatable member, while the second beam path is displaced along the rotation of the rotatable member, so as to adjust the distance between these two beam paths. The second beam path is therefore situated further away from the optical axis of the collimator lens than the first beam path.

This gives rise to a difficulty, in that, since the position of the beam waist is different for respective beams, desirable diameter of each beam suitable for image recording can not be achieved.

Further, the multibeam light source disclosed in Japanese Laid-Open Publication No. 9-261137 is adjusted so that the center of rotation for the laser array 31 is situated at the light emitting points E1 at one end of the array, as shown in FIG. 12. Therefore, the emitting point E4, which is situated at the opposing end to the emitting point E1, is far away from the optical axis and may not be able to form a suitable beam shape onto the recording substrate. This may also give rise to a shortcoming, in which high quality of recorded images can not be achieved.

In the multibeam light sources, therefore, further improvements are desirable to implement laser beam scanning capable of increasing speed and density of the information recording.

SUMMARY OF THE INVENTION

Accordingly, it is an object of this invention to provide an improved multibeam light source for laser beam scanning system, having most, if not all, of the advantages and features of similar employed systems, while eliminating many of the aforementioned disadvantages.

A further object of this invention is to provide a novel multibeam light source that is capable of achieving higher speed and density of information recording, in particular, through the formation of suitable laser beam diameter on recording substrates and of excellent recorded images without visually recognized phase differences between laser beam spots.

These and other objects are achieved according to the present invention by providing a multibeam light source for use in information recording disclosed herein which includes at least a semiconductor laser array provided with a plurality of light emitting points in a single package, in which the plurality of light emitting points, formed and positioned in linear relationship to one another, have an equidistant pitch, so as to respectively emit laser beams which are simultaneously scanned over a recording substrate.

The multibeam light source also includes means to adjust the position of the semiconductor laser array so as satisfy the relation $\theta \leq \tan^{-1}\{1/(n-1)\}$, where the angle $\theta$ is defined by two straight lines on the image recording substrate, the one drawn perpendicular to the primary scanning direction and the other drawn through respective centers of the first and n-th laser beam spots formed by projecting laser beams emitted respectively from the plurality of light emitting points.

In addition, the adjusting means is capable of rotating the semiconductor laser array around at least the vicinity of the midpoint of the straight line drawn by connecting centers of the first and n-th light emitting points. The interval of recorded dot density in a secondary scanning direction, which is formed by the adjustment of the laser array is preferably 50 µm at most.

In another aspect of the present invention, a multibeam light source may alternatively includes a plurality of semiconductor laser arrays each provided with a plurality of light emitting points in a single package in place of the above-mentioned single laser array. The multibeam light source also includes means provided for each of the semiconductor laser arrays to adjust individually the position of the semiconductor laser array so as satisfy the relation $\theta \leq \tan^{-1}\{1/(n-1)\}$, where the angle $\theta$ is defined by two straight lines described above for each of the semiconductor laser arrays.

In the multibeam light source, in addition, the optical axis of laser beams from the first laser array is aligned to approximately parallel to, yet being tilted by a relatively minute angle from, that of other laser arrays, so as the position of laser beam spots on the recording substrate, that is formed by the first laser array, be adjusted being displaced from that of beam spots from other laser arrays by a predetermined distance along the primary scanning direction.

Further aspect of the present disclosure and the manner in which it addresses the above problems, as well as others, will become more readily apparent from the following detailed description when taken in conjunction with the accompanying drawings, detailed description, and claims.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the detailed description which follows, specific embodiments of multibeam light sources particularly in use for electrophotographic imaging are described. It is understood, however, that the present disclosure is not limited to these embodiments. For example, it is appreciated that the use of the multibeam light source disclosed herein may also be adaptable to any form of information recording system. Other embodiments will be apparent to those skilled in the art upon reading the following description.

Figure 1:
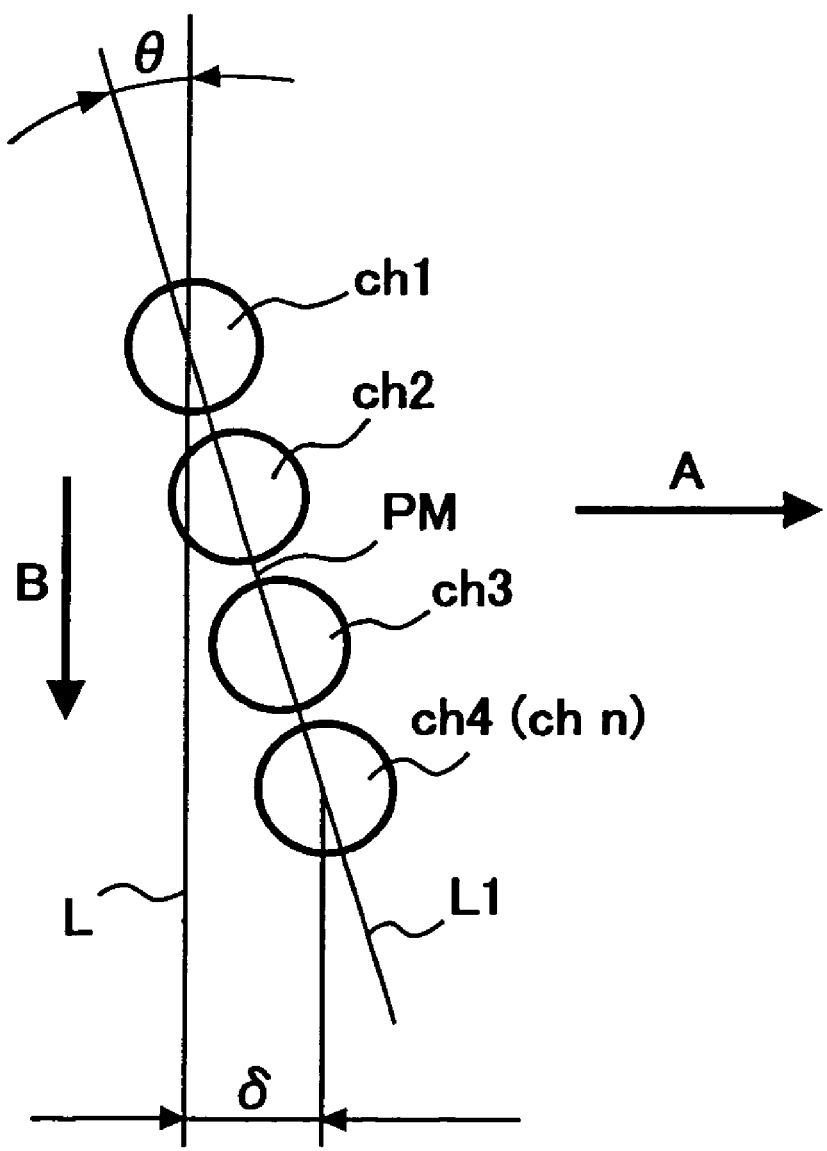
FIG. 1 is a schematic view illustrating beam spots from a multibeam light source according to one embodiment disclosed herein, which are formed of a plurality of laser beams that are respectively emitted from a laser array and irradiated on the surface of a photoreceptor.
Figure 2:
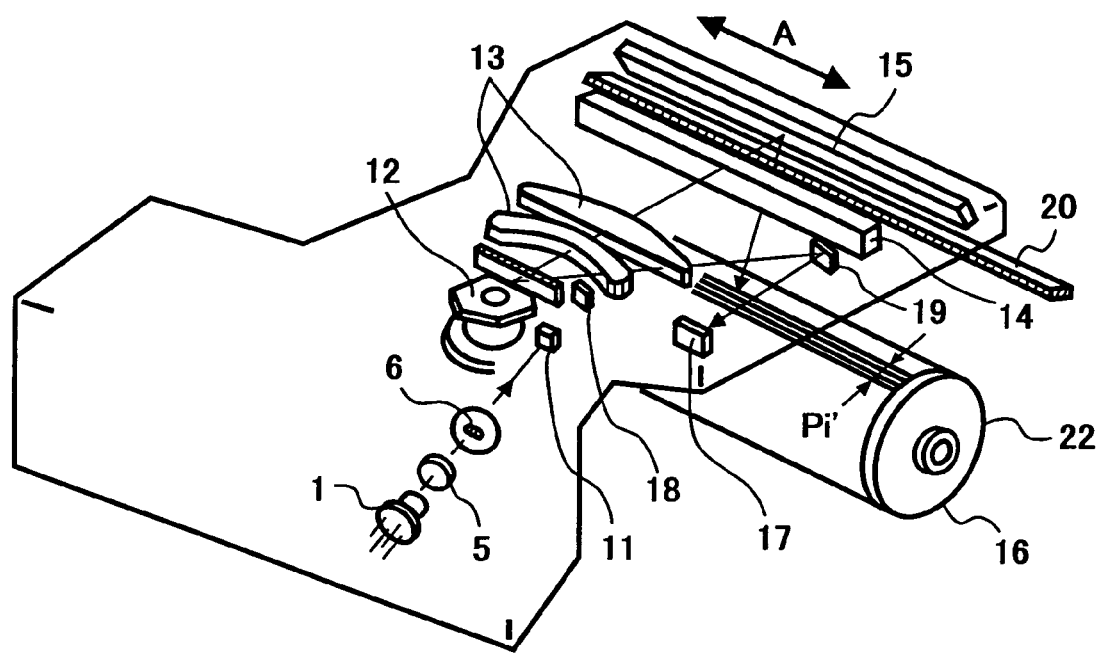
FIG. 2 is a perspective view of the overall construction of an information recording apparatus including a multibeam light source according to one embodiment disclosed herein.
Figure 3A:
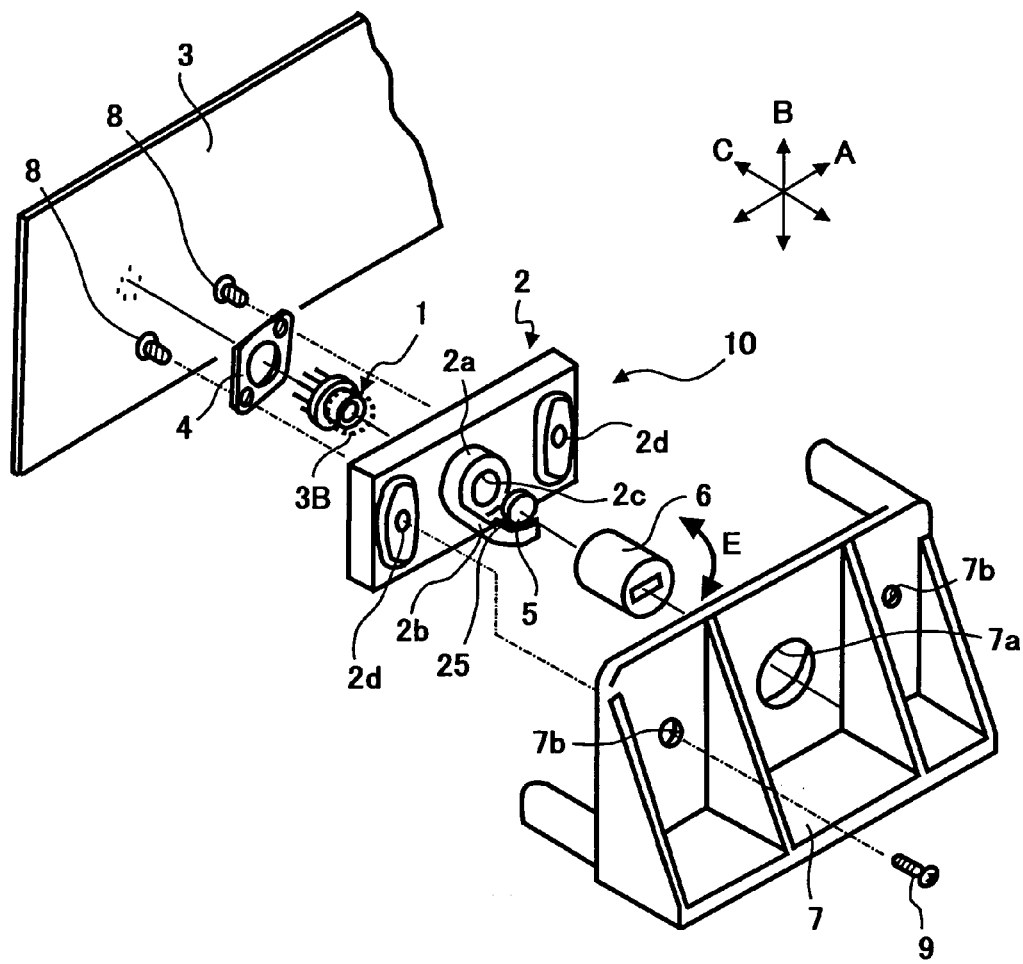
FIGS. 3A and 3B are extended, perspective views of a multibeam light source disclosed herein.
Figure 3B:
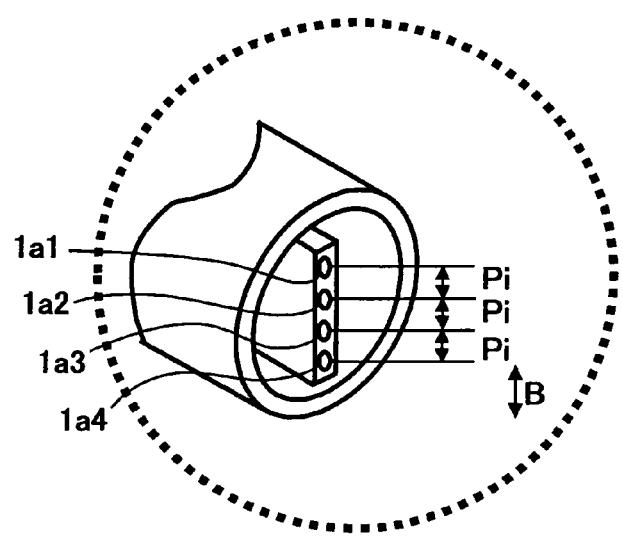

Referring now to the drawings, wherein like reference numerals designate identical or corresponding parts throughout the several views, and more particularly to FIG. 1 thereof, FIG. 1 is a schematic view illustrating beam spots from a multibeam light source disclosed herein, which are formed of a plurality of laser beams which are respectively emitted from light emitting sources (i.e., an array of semiconductor laser diodes) and are irradiated onto the surface of a photoreceptor, FIG. 2 is a perspective view of the overall construction of an information recording apparatus including a multibeam light source according to one embodiment disclosed herein and FIGS. 3A and 3B are extended, perspective view of the multibeam light source.

A semiconductor laser array 1 is provided as a multibeam light source shown in FIG. 3B. The laser array 1 has a plurality (four, in the present illustration) of light emitting points $1a_1 \sim 1a_4$ which are formed in a single package being positioned in linear relationship to one another with an equidistant pitch $P_i$.

Referring to FIG. 2, a plurality of laser beams emitted from the laser array 1 are collimated through a collimator lens 5 to be at least nearly parallel light flux and led through an aperture 6 to be shaped in a predetermined manner. The thus shaped laser beams are transmitted through cylindrical lens 11 and mirror 18 onto a rotating polygonal mirror 12 which serves as light deflection/scanning means.

By rotating the polygonal mirror 12, the laser beams are scanned repeatedly in the primary scanning direction designated by the arrow A in FIG. 2.

Four laser beams coexisting the beam flux are each reflected by the rotating polygonal mirror 12, converged through an image forming system consisted of an fθ lens 13 and a toroidal lens 14, then projected to form laser beam spots thorough a mirror 15 and a dust-proof glass plate 20 onto the scanning surface 22 of an image recording substrate 16 of a cylindrical photoreceptor drum.

Also shown in FIG. 2 are a mirror 19 and a photodetector 17, both being situated outside of the effective range of laser beam scanning. Using the mirror 19 and photodetector 17, the movement of the laser beam along the scanning direction is detected for each scan period to be utilized for controlling writing positions with the laser beams in a synchronous manner.

Referring now to FIGS. 3A and 3B, the construction of the multibeam light source is detailed herein below with respect to the light source together with its surrounding portions. In FIG. 3A, the arrows A, B and C represent the primary and secondary scanning directions and the direction of the optical axis, respectively.

The multibeam light source disclosed herein is used for scanning four beams, which is provided with a semiconductor laser array 1 having four light emitting points $1a_1 \sim 1a_4$. The light source further includes a holder 2, a regulator/driver unit 3, a pressing member 4, a collimator lens 5, an aperture 6 and a bracket 7, to be assembled altogether in a single unit, as shown in FIG. 3A.

The semiconductor laser array 1 is installed onto at least approximately at the center of the holder 2 by tightening two screws 8. During the fixing on the holder 2, the laser array 1 is placed so that four light emitting points $1a_1 14 \ 1a_4$ thereof are aligned at least in approximately linear relationship to one another in the secondary scanning direction shown by the arrow B using a positioning tool (not shown).

In addition, the holder 2 is provided with an interfitting portion 2a, being protruded therefrom, and the interfitting portion 2a, in turn, is provided with a partial flange 2b at the top thereof.

The collimator lens 5 is fixed on the partial flange 2b of the intermitting portion 2a using an ultraviolet curing adhesive resin 25 as follows.

The optimum configuration for the optical axis is first adjusted with respect to the position and direction of the collimator lens 5, with the semiconductor laser array 1 being turned on, by minutely displacing the collimator lens 5 along either A, B or C direction. Retaining this optimized configuration, the collimator lens 5 is subsequently fixed with an ultraviolet curing adhesive resin 26 under the irradiation with ultraviolet light.

That is, by bringing the optical axis of the collimator lens 5 to approximately at the center of a through-hole 2c formed in the interfitting rod portion 2a of the holder 2, the optical axis of the collimator lens 5 is thus adjusted to the center of the light emitting points $1a_1 \sim 1a_4$ (i.e., the middle of the points $1a_2$ and $1a_3$).

Furthermore, a subassembly 10 is formed by providing the aperture 6, which is formed of a cylindrical pipe with one side bottomed and has a notch formed thereon, so as to cover the collimator lens 5 over the portion of the partial range 2b of the of the holder 2.

By rotatably inserting the interfitting rod portion 2a of the holder 2, in the direction shown by the arrow E, into a fitting through-hole 7a which is formed approximately at the center of the bracket 7, the subassembly 10 is fixed on the bracket 7 by tightening two screws 9, 9 to respective tapped holes 2d. During the fixing step, the subassembly 10 is rotated as a whole around the axis of the fitting through-hole 7a within the looseness of holes 7b on the bracket 7 with respect to the size of the screws 9.

As a result, through the above rotation around the axis of the fitting through-hole 7a, the orientation of the subassembly 10 as a whole may be adjusted such that four light emitting points $1a_1 \sim 1a_4$ are aligned at least in approximately linear relationship to one another along the secondary scanning direction shown by the arrow.

Incidentally, this adjustment may be achieved with relative ease by detecting the position of the light emitting points $1a_1$ and $1a_4$ using a CCD camera, for example.

The construction of the multibeam light source is then completed by providing a regulator/driver unit 3 connected to the subassembly 10.

There will be detailed hereinbelow four laser beam spots which are formed by light beams emitted from respective light emitting points $1a_1 \sim 1a_4$ on the laser array 1 to be projected onto the image recording substrate 16 of a cylindrical photoreceptor drum.

Figure 4:
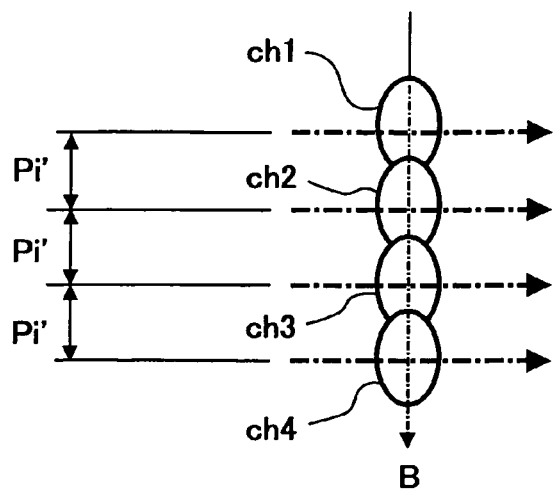
FIG. 4 is a schematic view illustrating beam spots formed on a photoreceptor substrate, being aligned linearly in the secondary scanning direction with an equidistant pitch Pi'.

In ideal cases, four laser beam spots $ch_1 \sim ch_4$, which are projected onto the image recording substrate 16 of a cylindrical photoreceptor drum, are preferably aligned linearly in the secondary scanning direction (the arrow B) with an equidistant pitch Pi', as shown in FIG. 4.

In contrast, FIG. 1 illustrates the case encountered often in practice, in which the alignment direction of four laser beam spots $ch_1 \sim ch_4$ is tilted by an angle θ with respect to the line L drawn along the secondary scanning direction.

According to one embodiment disclosed herein, even when four laser beam spots $ch_1 \sim ch_4$ are aligned being tilted with respect to the line L, the diameter desirable for the respective beam spots utilized in recording may preferably be achieved on the image recording substrate 16 of a cylindrical photoreceptor drum, as long as the angle θ remains within the value defined herein below. Since no appreciable phase difference between the four is visually recognized under the above conditions, this result in satisfactory quality of recorded images.

These points described just above will be detailed further herein below.

Figure 5:
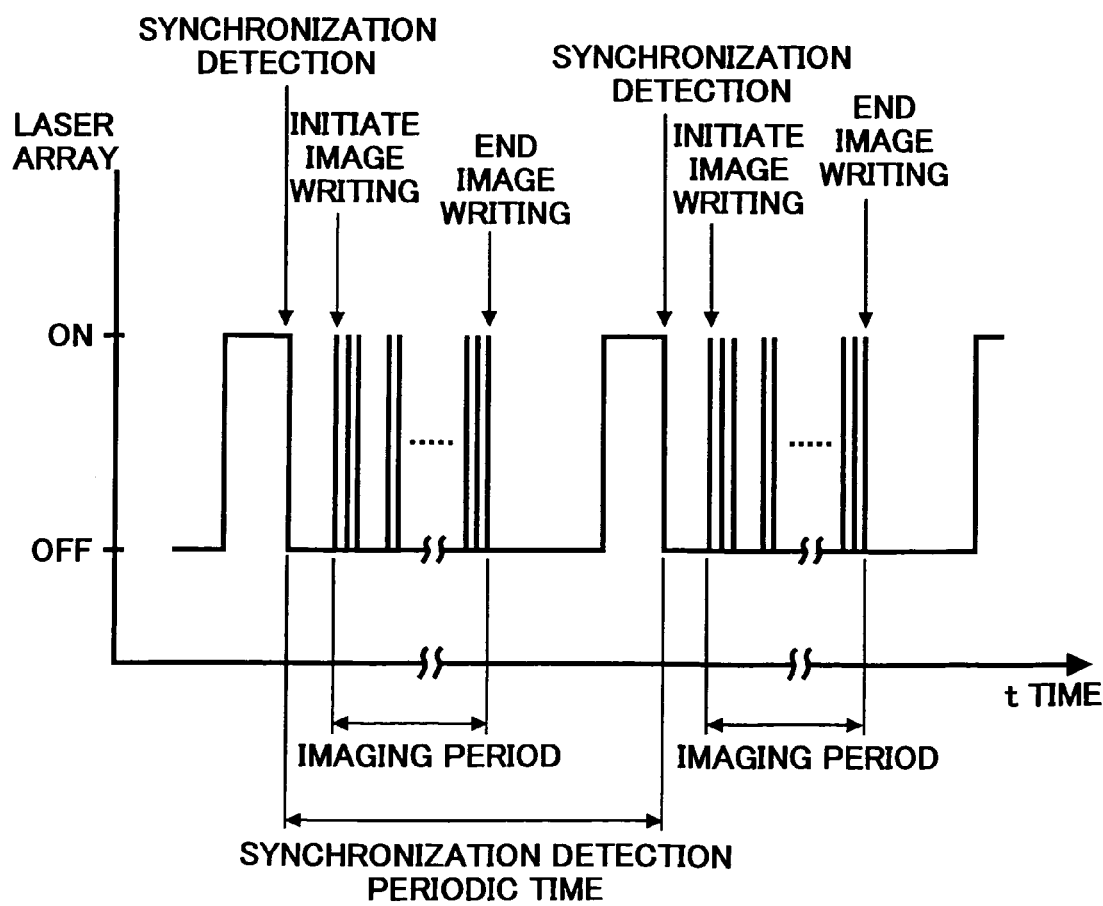
FIG. 5 includes a chart illustrating the timing for actuating a laser array according to one embodiment disclosed herein.

Four laser beams emitted from respective light emitting points $1a_1$~$1a_4$ are scanned repeatedly in each scan period over the recording substrate 16, as described earlier. Since the scan period is predetermined and the time is therefore known when the laser beams are incident on a photodetector 17, the laser array is turned on just prior to the incidence based on the timing shown in FIG. 5, thereby to be able to generate a first synchronization signal.

In a certain (and adjustable) period of time thereafter, an image recording is initiated. After completing the recording, the laser array is turned off and set ready for the next synchronization detection.

Incidentally, it should be noted regarding to the optical images of the plurality beam spots formed on the detector 17. Although the optical images are formed also on the detector 17 aligned linearly in the secondary scanning direction, they are not in focus but rather in the shape of an elongated slit, since these beams (or synchronization detection beams), are not transmitted through the toroidal lens 14.

There is detailed herein below about the quantity, deviation $\delta$ (FIG. 1), which is defined by the magnitude of the tilt of the alignment direction of four laser beam spots $ch_1$, $ch_2$ and $ch_4$ with respect to the line L projected to the primary scanning direction.

It is generally accepted that the deviation $\delta$ ranging approximately one or one half dot at most in magnitude does not appreciably affect the recorded image quality.

Since one dot distance=25.4 mm/600=42.33 $\mu$m for the density of 600 dot per inch (dpi) recording, satisfactory image quality may therefore be achieved as long as the four laser spots $ch_1$~$ch_4$ are situated within the thus obtained 42.33 $\mu$m distance. Further, the 42.33 $\mu$m distance is large enough to successfully carry out the beam alignment by observing the positions of the beam spots $1a_1$~$1a_4$ at the both ends using, for example, a CCD camera.

Therefore, by adjusting the alignment of the four light emitting points $1a_1$~$1a_4$ through rotating the four laser spots $ch_1$~$ch_4$ such that the deviation $\delta$ for these spots has a magnitude which does not affect the recorded image quality, satisfactory timing for information recording onto the recording substrate 16 may be achieved. Further, this timing for information recording becomes feasible through the synchronization detection signal using only one out of four laser beams for each scan period, which is capable of resulting in satisfactory image quality, since no appreciable phase difference between the four spots is recognized visually under these conditions.

As a result, beam scanning becomes feasible using a similar system of photodetector and control circuit to that utilized in the one beam scanning.

According to the embodiment disclosed herein, therefore, relatively complicated sensors and a beam detection algorithm such as disclosed in Japanese Laid-Open Publication No 9-251137 are alleviated. Also, the correction procedures on dot writing positions may be eliminated, which are necessitated in the previously known multibeam light sources disclosed in Japanese Laid-Open Publications Nos. 9-211350 and 9-1861.

The aforementioned deviation angle (or tilting angle) $\theta$ is detailed as follows.

Referring to FIG. 1, a semiconductor laser array 1 is provided having n (such as 4, in the present embodiment) laser beams emitted therefrom. A straight line L is drawn on, perpendicular to the primary scanning direction of, the image recording substrate 16; and another straight line $L_1$ is also drawn through the centers of two beam spots $ch_1$ and $ch_4$ formed on the image recording substrate 16 by the beams emitted respectively from the first and n-th light emitting points $1a_1$ and $1a_4$ ($1a_n$). The tilting angle $\theta$ is then defined as the angle made by the straight lines L and $L_1$.

According to one embodiment disclosed herein, by adjusting the alignment of the light emitting points so as to satisfy the following relation, excellent recorded image quality is obtained without appreciable phase difference recognized visually between the four beam spots;

$$\theta \leq \tan^{-1}\{1/(n-1)\}.$$

As an example, for the semiconductor laser array 1 having four light emitting points $1a_1$~$1a_4$ with n=4, the result $\theta \leq 18.4°$ is obtained. Therefore, the amount of the deviation $\delta$, which is described earlier referring to FIG. 1 and found for the laser beam spots $ch_1$ and $ch_4$ in the primary scanning direction shown as the arrow A, may be brought to the range (i.e., 1 dot at most) which does not appreciably affect the recorded image quality, by adjusting the tilting angle to 18.4° at most.

This is accomplished through the adjustment of the alignment direction of the light emitting points by rotating the subassembly 10 as a whole, which consists of both collimator lens 5 and aperture 6 affixed thereto as described earlier referring to FIG. 3A, around the axis of the fitting through-hole 7a within the looseness of holes 7b on the bracket 7 with respect to the size of the screws 9, such that the tilting angle $\theta$ be brought to 18.4° at most.

In the present embodiment, therefore, the following portions of the multibeam light sources such as subassembly 10, the bracket 7 which includes the fitting through-hole 7a to allow for the portion of the aperture 6 to be inserted thereto and two tapped holes 7b, 7b; and two screws 9, 9 which tighten the subassembly 10 to the bracket 7, operate as the means for adjusting the position of the laser array 1 so as satisfy the relation $\theta \leq \tan^{-1}\{1/(n-1)\}$.

In addition, since the above means for adjustment operates in such a manner that the rotation for the adjustment is carried out around the midpoint PM (FIG. 1) of the straight line which is drawn connecting the centers of the first and the fourth (n-th) light emitting points, $ch_1$ and $ch_4$, out of the four points $ch_1$~$ch_4$ the deviation from the ideal case in the shape of the beam spots projected onto the recording substrate 16 can be minimized with relative ease, thereby preventing the degradation of the recorded image quality.

Figure 12:
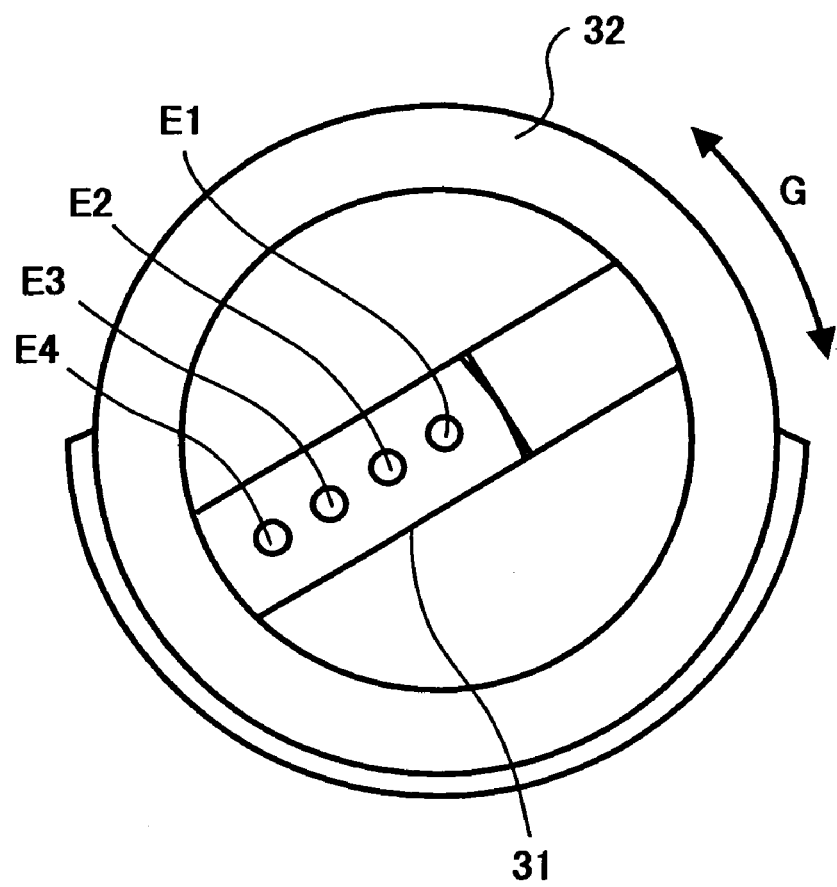
FIG. 12 is a front view illustrating typically four light emitting points on a laser array, in which the center of rotation for the laser array is situated at a light emitting point at one end of the array.

This is an improvement over previous multibeam light sources. For the latter source, as illustrated in FIG. 12, the adjustment through rotation is carried out around a first emitting point at one end of the array of light emitting points such as E1, for example, out of four emitting points E1~E4.

Figure 6:
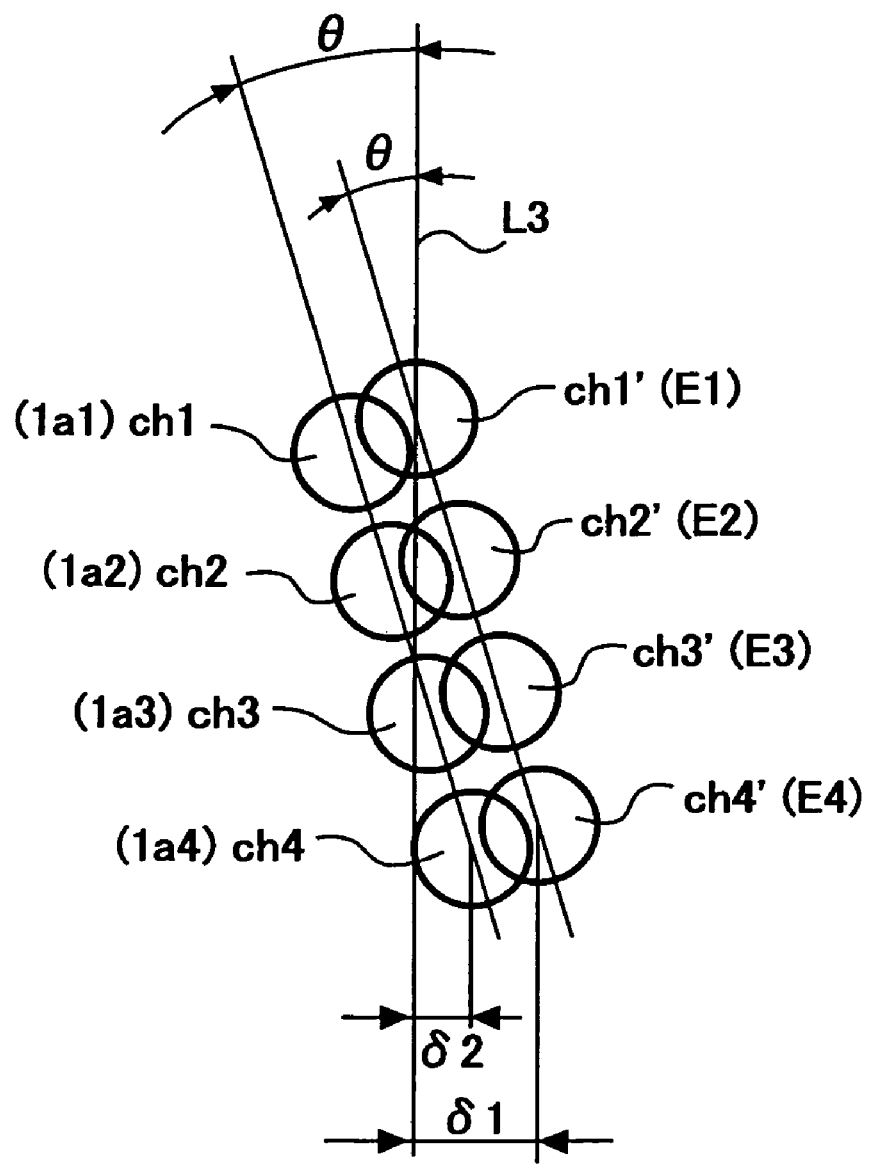
FIG. 6 is a schematic view illustrating beam spots formed on a photoreceptor substrate, being tilted by an angle $\theta$ with respect to the secondary scanning direction.

In this case, if the alignment direction of beam spots, which formed on the image recording substrate 16 by the beams emitted respectively from the laser array 31, is tilted by an angle $\theta$ with respect to ideal positions (on the straight line $L_3$) as shown in FIG. 6, the beam spot $ch_4'$, which is formed of the laser beam emitted from the emitting point E4 at the other end of the array, gives rise to a considerable deviation $\delta_1$ from its ideal position.

Therefore, for the beam spot $ch_4'$, which is formed of the laser beam emitted from the emitting point E4 and situated furthest from the center of the rotation, the beam shape of the beam spot $ch_4'$ is also considerably deformed from its ideal shape with the increase in the distance from the center and also from the optical axis. This results in undue decrease in quality of recorded images.

In contrast, according to the present embodiment of the multibeam light source disclosed herein, since the center of the rotation is situated at the midpoint between the points $1a_2$ and $1a_3$, this gives rise to a deviation $\delta_2$ considerably reduced from its ideal position as illustrated in FIG. 6. In addition, since the midpoint between the emitting points $1a_2$ and $1a_3$ (or the center of rotation) is situated closer to the optical axis of the collimator lens 5 (FIG. 2), excellent quality in recorded images may be achieved.

Further, in the embodiment disclosed herein, as described earlier, laser beam spots formed on the image recording substrate 16 are aligned on a straight line approximately perpendicular to the primary scanning direction shown by the arrow A in FIG. 3A (or in the secondary scanning direction shown by the arrow B). Since the interval of recorded dot density is determined by the lateral magnification along the secondary scanning direction, a predetermined recorded dot density may be obtained by suitably selecting a cylinder lens having an adequate magnification along that direction. In this context, it is added that the recorded dot density may generally be adjusted to be 50 $\mu$m at most.

The present embodiment of the multibeam light source is detailed above in terms of four light emitting points $1a_1$~$1a_4$ in the semiconductor laser array. However, the number of the emitting points is by no means limited to four, as above specified, but the present method is also applicable to multibeam light sources having two, three, or five or more emitting points.

In another embodiment, a multibeam light source will be disclosed, which is provided with a plurality of semiconductor laser arrays.

Figure 7:
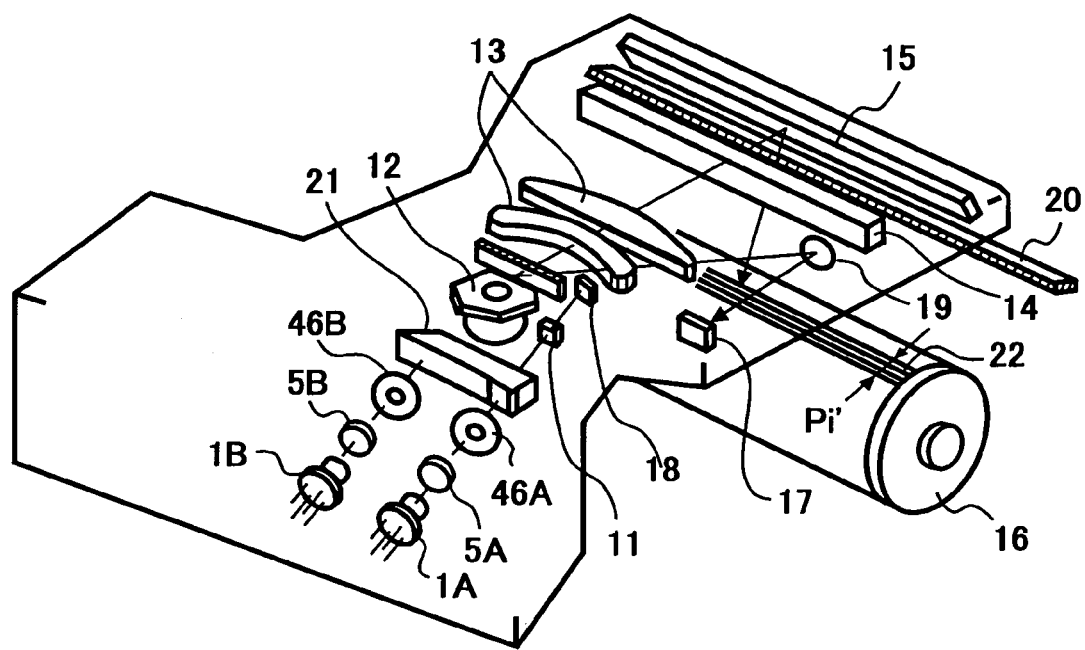
FIG. 7 is a perspective view of the overall construction of a multibeam light source included in an information recording apparatus according to another embodiment disclosed herein, in which two semiconductor laser arrays are provided.
Figure 8A:
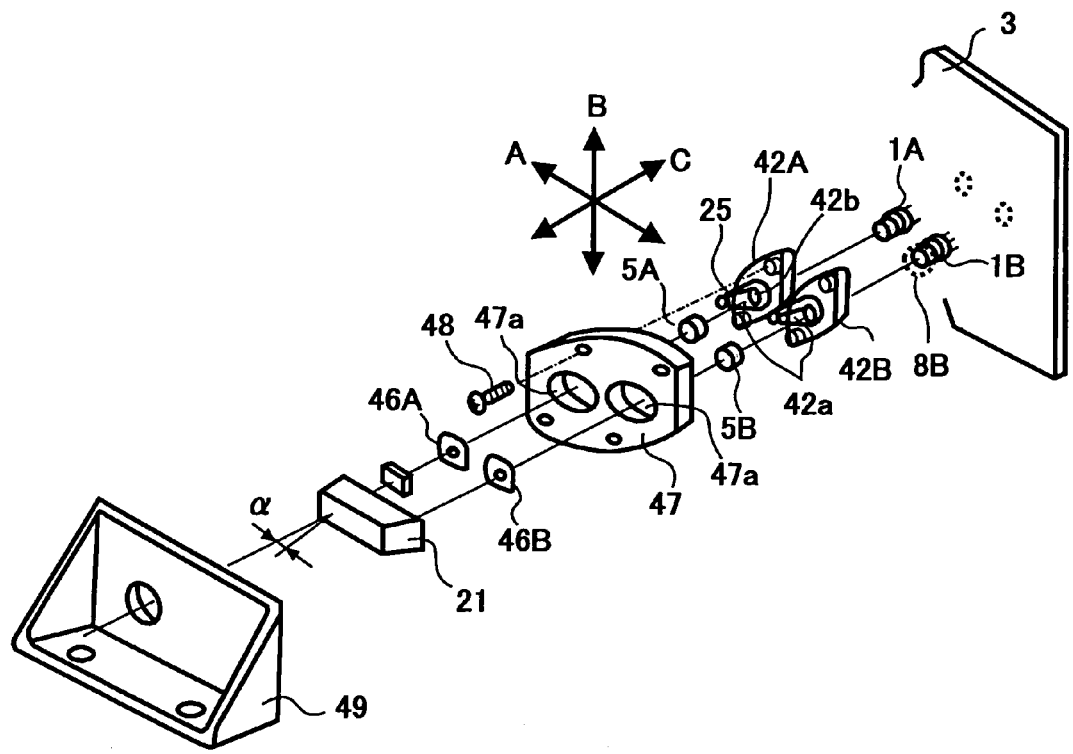
FIGS. 8A and 8B are extended, perspective views of a multibeam light source provided with two laser arrays according to another embodiment disclosed herein.
Figure 8B:
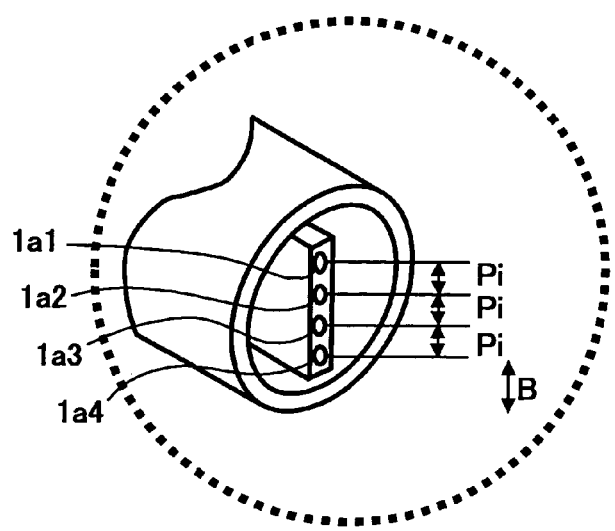

FIG. 7 is a perspective view of the overall construction of the multibeam light source included in an information recording apparatus according to another embodiment disclosed herein, which is provided with two laser arrays, and FIGS. 8A and 8B are extended, perspective views of the multibeam light source of FIG. 7. Like reference numerals will be used in FIGS. 7, 8A and 8B to refer to like elements as those in FIGS. 2, 3A and 3B.

Referring to FIGS. 8A and 8B, two laser arrays 1A and 1B each include a plurality (four, again in the present example) of light emitting points $1a_1$~$1a_4$ which are formed in a single package being positioned in linear relationship to one another with an equidistant pitch $P_i$.

In the multibeam light source disclosed herein, the plurality of laser beams emitted from the laser arrays 1A and 1B are each collimated through collimator lenses 5A and 5B to form at least nearly parallel light fluxes, led through apertures 46A and 46B to be shaped in a predetermined manner, and synthesized by a beam synthesizer 21.

The thus synthesized laser beams are transmitted through cylinder lens 11 and mirror 18 onto a rotating polygonal mirror 12. By rotating the polygonal mirror 12, the laser beams are scanned repeatedly in the primary scanning direction.

The plurality of laser beams are each reflected by the rotating polygonal mirror 12, converged through an image forming system consisted of an f$\theta$ lens 13 and a toroidal lens 14, subsequently projected to form laser beam spots thorough a mirror 15 and a dust-proof glass plate 20 onto the scanning surface 22 of an image recording substrate 16 of a cylindrical photoreceptor drum.

In addition, a photodetector 17 and a mirror 19 are further provided, both being situated outside of the effective range of laser beam scanning. Using the mirror 19 and photodetector 17, the movement of the laser beams along the scanning direction is detected for each scan period to be utilized for controlling write positions with the laser beams in a synchronous manner.

As shown in FIG. 8A, the multibeam light source disclosed herein includes semiconductor laser arrays 1A and 1B, holders 42A and 42B, a regulator/driver unit 3, collimator lenses 5A and 5B, apertures 46A and 46B, and a bracket 7, to be assembled altogether into respective single units, as light source subassemblies.

Further shown in FIG. 8A are arrows A, B and C, which represent the primary and secondary scanning directions and the direction of the optical axis, respectively.

The semiconductor laser arrays 1A and 1B are installed on the holders 42A and 42B, respectively, by press fitting, for example. In addition, the laser arrays 1A and 1B are formed similar to each other in structure, each including four light emitting points $1a_1$~$1a_4$, as mentioned earlier.

The laser arrays 1A and 1B are each fixed on the holders 42A and 42B, respectively, so that four light emitting points $1a_1$~$1a_4$ thereof are aligned at least in approximately linear relationship to one another in the secondary scanning direction shown by the arrow B in FIG. 8A using a positioning tool. The thus prepared holders 42A and 42B are subsequently fixed onto the bracket 47.

The subsequent step of fixing is carried out using an ultraviolet curing adhesive resin 25, in which the collimator lens 5A onto a partial flange 42a of the holder 42A, and the collimator lens 5A onto another partial flange 42b of the holder 42B, respectively. During the fixing step, optimum configuration for the optical axis is first adjusted with respect to the position and direction of the collimator lens 5, with the laser array 1 being turned on, by displacing minutely the collimator lenses 5A and 5B along either A, B or C direction.

Subsequently, the collimator lenses 5A and 5B are fixed onto the holders 42A and 42B, respectively, by hardening the ultraviolet curing adhesive resin 25 under ultraviolet light irradiation.

In addition, the laser beams, which are collimated through a collimator lens 5 to be at least nearly parallel light flux, are then led through the apertures 46A and 46B to be shaped in a predetermined manner.

The previously prepared light source subassemblies are subsequently fixed onto the bracket 47, respectively, by rotatably inserting the interfitting rod portions 42a and 42b of the holders 42A and 42B into through-holes 47a, 47a, then tightening two screws 48, 48.

During the above fixing step, respective subassemblies are respectively rotated as a whole around the axis of the fitting through-holes 47a, 47a within the looseness of holes with respect to the size of the screws 48.

As a result, through this rotation around the axis of the fitting through-holes 47a, 47a, the overall orientation of the respective subassemblies may be adjusted such that four light emitting points $1a_1$~$1a_4$ thereon are aligned at least in approximately linear relationship to one another along the secondary scanning direction as shown by the arrow B.

This adjustment may be achieved with relative ease by detecting the position of the light emitting points $1a_1$~$1a_4$ using, for example, a CCD camera.

The plurality of laser beams emitted from the laser arrays 1A and 1B are led through apertures 46A and 46B, as described earlier. These laser beams are subsequently synthesized by a beam synthesizer 21 such that the optical axis of laser beams from the laser array 1B is aligned to approximately parallel to, yet being tilted by a relatively minute angle α from, that from the laser array 1A, in which the latter is taken as a reference for the present adjustment.

The beam synthesizer 21 is then fixed onto a predetermined position on the other face of the bracket 49 with tightening means (not shown) such as, for example, screws, to be assembled altogether into a single unit. Subsequently, the previously prepared light source subassemblies with the semiconductor laser arrays 1A and 1B and regulator/driver unit 3 are additionally fixed onto the bracket 49, whereby the construction of the multibeam light source is completed.

Figure 9:
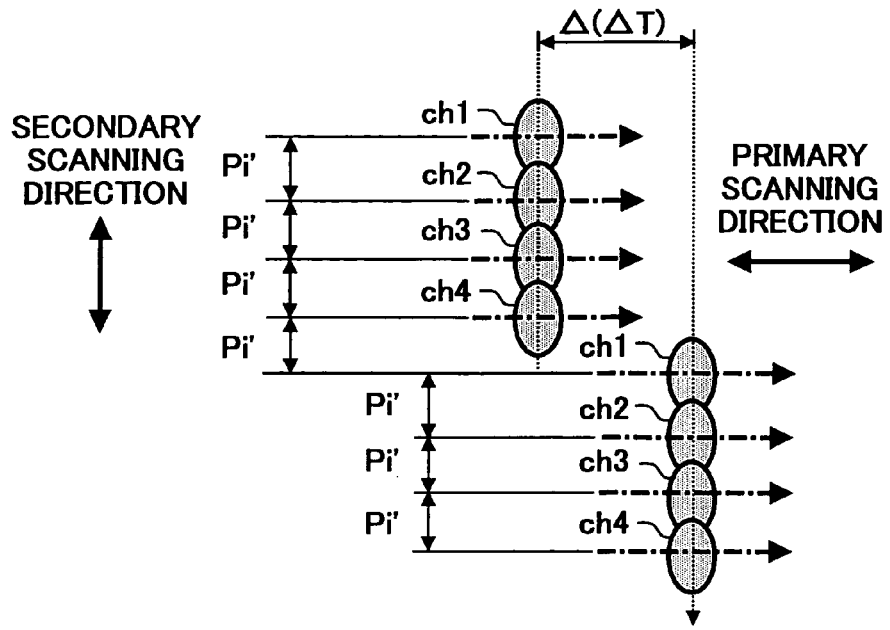
FIG. 9 is a schematic view illustrating laser beam spots from the multibeam light source of FIG. 8A, which are formed of two sets of four laser beams emitted respectively from two laser arrays and irradiated on the surface of a recording substrate, in which the four laser beam spots are respectively aligned linearly in the secondary scanning direction.
Figure 10:
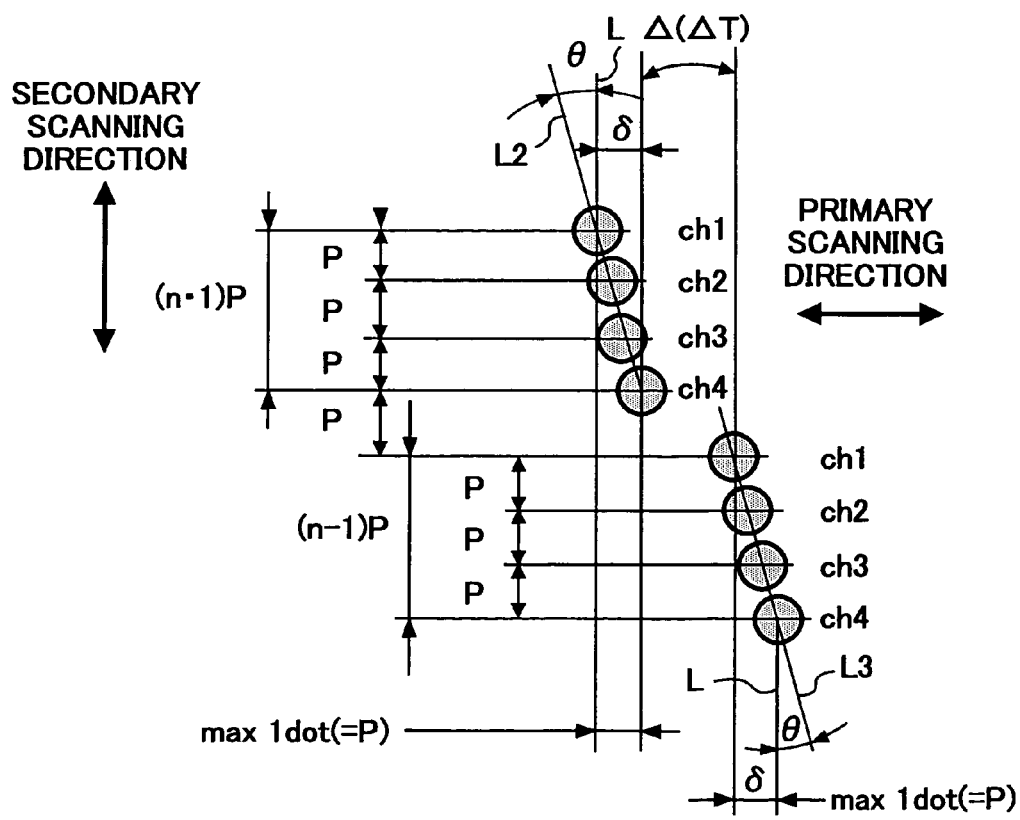
FIG. 10 is a schematic view illustrating laser beam spots from the multibeam light source of FIG. 8A, which are formed of two sets of four laser beams emitted respectively from two laser array and irradiated on the surface of a recording substrate, in which the four laser beam spots are aligned, each having the alignment direction tilted by an angle with respect to the line drawn along the secondary scanning direction.

FIGS. 9 and 10 schematic views illustrating beam spots from a multibeam light source of FIG. 8A, which are formed of two sets of four laser beams emitted from the laser arrays 1A and 1B, and irradiated onto the surface of the recording substrate 16.

FIG. 9 illustrates the beam spots in an ideal case, while FIG. 10 illustrates those which are formed, each having an alignment direction of the four laser beam spots tilted by an angle θ with respect to the line L drawn along the secondary scanning direction.

Referring again to FIG. 9, four laser beam spots $ch_1 \sim ch_4$ are aligned linearly in the secondary scanning direction, which are formed by light beams emitted from emitting points $1a_1 \sim 1a_4$ on respective laser arrays 1A and 1B and projected onto the image recording substrate 16 (FIG. 7) of a cylindrical photoreceptor drum.

In addition, the line of the alignment for the second set of the four laser beam spots $ch_1 \sim ch_4$ from the laser array 1B (the bottom portion of FIG. 9) is displaced by a distance Δ in the primary scanning direction from that of the first set of the beam spots $ch_1 \sim ch_4$ from the array 1A (the top portion of FIG. 9). This is made during the synthesizing steps, in that the optical axis of laser beams from the laser array 1B is aligned to approximately parallel to, and is tilted by a relatively minute angle a from, the optical axis of the laser array 1A.

In contrast, FIG. 10 illustrates the case encountered often in practice, in which the alignment direction of respective sets of the four laser beam spots is tilted by an angle θ from the secondary scanning direction.

That is, referring to FIG. 10 again, respective sets of four laser beam spots $ch_1 \sim ch_4$ are aligned linearly such that two straight lines are each tilted by an angle θ with respect to the line L drawn along the secondary scanning direction, the first line $L_2$ being drawn through the centers of four laser beam spots $ch_1 \sim ch_4$ from the laser array 1A and the second line $L_3$ being similarly drawn for the beam spots from the laser array 1B.

Using the multibeam light source disclosed herein, four laser beams emitted from the semiconductor laser array 1A are scanned repeatedly in each scan period over the recording substrate 16, as described earlier.

Figure 11:
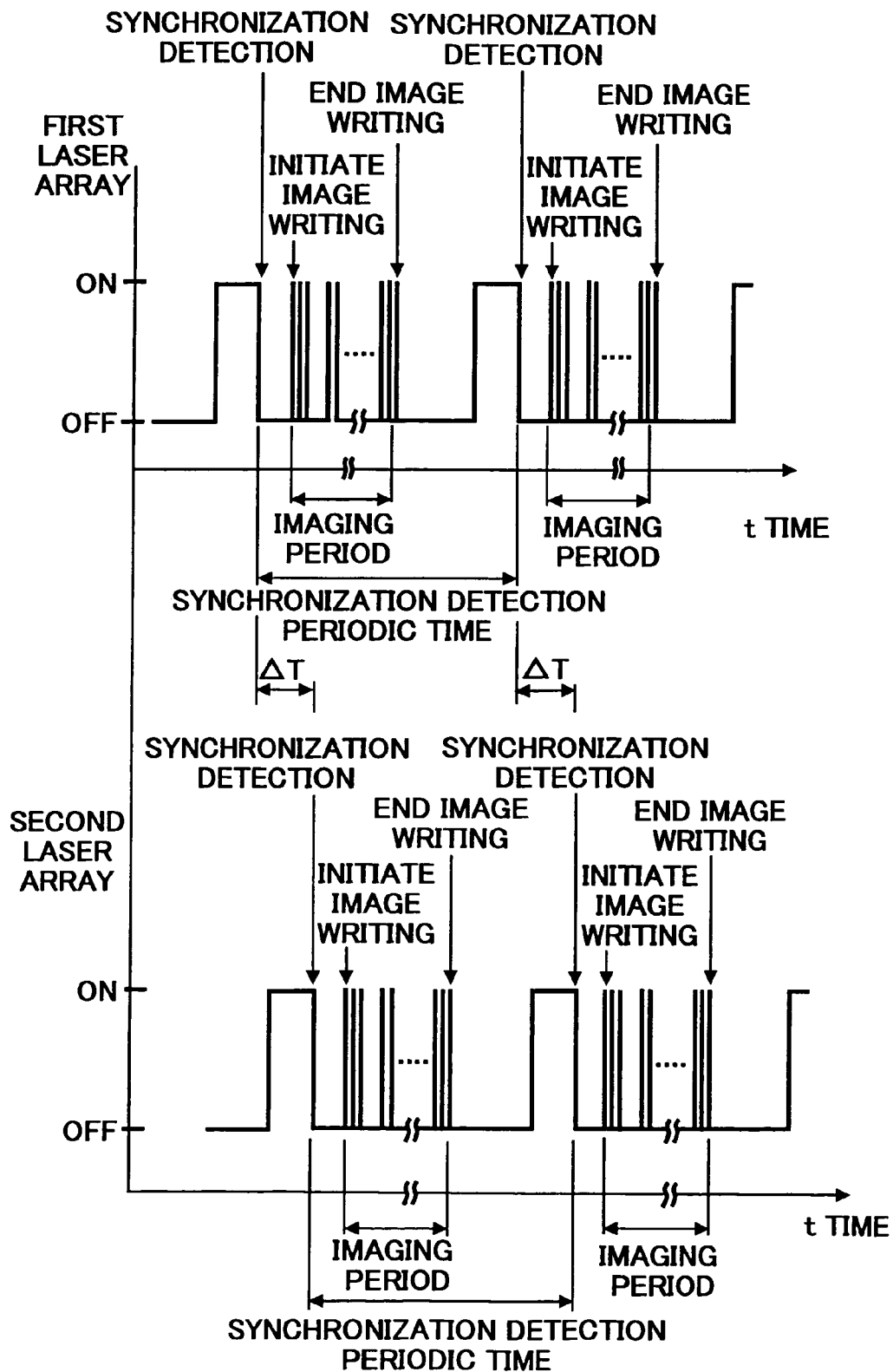
FIG. 11 includes a chart illustrating the timing for actuating tow laser arrays according to another embodiment disclosed herein.

Since the scan period predetermined and the time is therefore known when the laser beams are incident on a photodetector 17, the laser array is turned on just prior to the incidence based on the timing shown in FIG. 11, to be thereby able to generate a first synchronization signal. A certain (and adjustable) period of time thereafter, an image recording step is initiated.

After completing the recording step with the first set of laser beams from the array 1A, the four laser beam spots $ch_1 \sim ch_4$ are turned off and set ready for the next synchronization detection. A time period ΔT after the first synchronization signal, the second synchronization signal is generated from the four laser beams from the laser array 1B, which is illustrated in the bottom half portion of FIG. 11, being represented as the second laser array.

Incidentally, although the optical images of the plurality beam spots are formed also on the detector 17, being aligned linearly in the secondary scanning direction, they are formed not in focus but rather in the shape of an elongated slit, since these beams (or synchronization detection beams), are not transmitted through the toroidal lens 14.

The quantity deviation δ, detailed herein below, was defined earlier by the magnitude of the tilt of the alignment direction of four laser beam spots $ch_1$, $ch_2$, $ch_3$ and $ch_4$ for respective laser arrays with respect to the primary scanning direction.

As described earlier referring to FIG. 1, it is generally accepted that the deviation δ ranging approximately one or one half dot at most in magnitude does not affect appreciably to the recorded image quality.

Since one dot distance=25.4 mm/600=42.33 μm for the density of 600 dot per inch (dpi) recording, satisfactory image quality may therefore be achieved as long as the four laser spots $ch_1 \sim ch_4$ from the laser array 1A are aligned within the thus obtained 42.33 μm distance.

In a similar manner, as long as the four laser spots $ch_1 \sim ch_4$ from the laser array 1B are aligned within the 42.33 μm distance, satisfactory image quality may also be achieved.

Further, the 42.33 μm distance is large enough to be able to carry out the beam alignment by observing the positions of the beam spots lay and lad at the both ends using a CCD camera, as indicated earlier.

Therefore, by adjusting the alignment of the four light emitting points $1a_1 \sim 1a_4$ through rotating the four laser spots $ch_1 \sim ch_4$ such that the deviation δ for these spots has a magnitude which does not to affect the recorded image quality, satisfactory timing for information recording onto the recording substrate 16 may be achieved. Further, this timing for information recording becomes feasible through the synchronization detection signal using only one out of four laser beams for each scan period, which is capable of resulting in satisfactory image quality.

As a result, beam scanning becomes feasible by using a similar system of photodetector and control circuits as utilized in the one beam scanning system.

Accordingly, relatively complicated sensors and beam detection algorithm such as disclosed in Japanese Laid-Open Publication 9-251137 are also alleviated according to the present embodiment, as well as the embodiment disclosed earlier with a single laser array. As a result, the correction procedures for recording positions may be eliminated, which are necessitated in the previous multibeam light sources such as those disclosed in Japanese Laid-Open Publications 9-211350 and 9-1861.

The aforementioned tilting angle θ is now herein described below.

Referring to FIG. 10, semiconductor laser arrays 1A and 1B are provided, each having n (such as 4, FIG. 8B) laser beams emitted therefrom. A straight line L is then drawn on, perpendicular to the primary scanning direction of, the image recording substrate 16. Also, other straight lines $L_2$ and $L_3$ are respectively drawn through the centers of two sets of beam spots $ch_1$ and $ch_4$ formed on the image recording substrate 16 by the beams emitted from the Fret and n-th light emitting points $1a_1$ and $1a_4$ ($1a_n$) on the laser arrays 1A and 1B. The tilting to angle θ is then defined as the angle made by the straight lines L, and $L_2$ or $L_3$.

According to the present embodiment disclosed herein, means to adjust the alignment of the light emitting points are provided to respective laser arrays 1A and 1B so as to satisfy the following relation $\theta \leq \tan^{-1}\{1/(n-1)\}$.

As an example, for the laser arrays 1A and 1B shown in FIG. 8B, each baring four light emitting points $1a_1$~$1a_4$ with n=4, the result $\theta \leq 18.4°$ is obtained.

Therefore, the amount of the deviation δ may be brought to the range (i.e., one dot at most) which does not affect appreciably the recorded image quality, by adjusting the tilting angle to 18.4° at most. This is accomplished through the adjustment of the alignment direction of the light emitting points on the laser array 1A by rotating the aforementioned holder 42A as a whole, which the laser array 1A and collimator lens 5A are affixed thereto previously, around the axis of the fitting through-hole 47a within the looseness of holes 47a on the bracket 47 with respect to the size of the screws 48, such that the tilting angle θ be brought to 18.4° at most.

Similarly, for the light emitting points on the laser array 1B, the amount of the deviation θ may also be brought to the range of one dot at most, which does not appreciably affect the recorded image quality, by adjusting the tilting angle to 18.4° at most. This is accomplished again through rotating the direction of the light emitting points on the laser array 1B, that is, by rotating the aforementioned holder 42B as a whole, which the laser array 1B and collimator lens 5B are affixed thereto previously, around the axis of the fitting through-hole 47a within the looseness of holes 47b on the bracket 47 with respect to the size of the screws 48.

In the present embodiment, therefore, the following portions of the multibeam light sources such as the holder 42A, on which the laser array 1A and collimator lens 5A are affixed previously; the bracket 47 which includes two fitting through-holes, and two screws 48, 48 for tightening, serve as the means of capable of adjusting the position of the laser array 1A so as satisfy the relation $\theta \leq \tan^{-1}\{1/(n-1)\}$.

In a similar manner, the portions such as the holder 42B, on which the laser array 1B and collimator lens 5B are affixed previously; the bracket 47 which includes two fitting through-holes, and two screws 48, 48 for tightening, serve as the means for adjusting the position of the laser array 1B so as satisfy the relation $\theta \leq \tan^{-1}\{1/(n-1)\}$.

It may be added in the multibeam light source according to the present embodiment, the distance between neighboring emitting points may be decreased with relative ease to the range of submicrons by possibly utilizing latest semiconductor processing steps.

The above means of the adjustment for the respective laser arrays 1A and 1B effects each in such a manner that the rotation for the adjustment is carried out around the midpoint M (FIG. 10) of the straight line which is drawn connecting the centers of the first and the n-th (fourth) light emitting points, $ch_1$ and $ch_4$, out of the plurality of points; this thereby enables the adjusting of the tilting angle θ.

As a result, for each of the laser arrays 1A and 1B, the center of rotation is situated at the midpoint of the four laser beam spots $ch_1$~$ch_4$, which is, in turn, situated along the axis of the fitting through-hole 47a, and which is evidently brought to the vicinity of the optical axis of collimator lens 5A (or 5B).

In contrast, as disclosed in Japanese Laid-Open Publication No. 9-251137, when the adjustment through rotation is carried out around a first emitting point at one end of the array, the distance of other emitting points from the optical axis increases with increasing distance from the rotation axis.

As a result, for the beam spot $ch_4'$ which is formed being situated furthest from the rotation axis, its beam shape is deformed appreciably from the ideal shape, to result thereby in undue decrease in quality of recorded images.

Further, in the multibeam light source according to the present embodiment, laser beam spots formed on the image recording substrate 16 are aligned on a straight line approximately perpendicular to the primary scanning direction shown in FIG. 10 (or approximately in the secondary scanning direction).

The interval of recorded dot density is determined by the lateral magnification along the secondary scanning direction, as described earlier. A predetermined recorded dot density may therefore be obtained by suitably selecting a cylinder lens having an adequate magnification along that direction. In this context, it is added that the recorded dot density may generally be adjusted to be 50 μm at most.

With the multibeam light source according to the present embodiment, which is provided with two laser arrays 1A and 1B, improvements can therefore be feasible over previous multibeam light sources, achieving the increase in speed and density of the information recording. It should be noted that the above number of laser array is not limited to two, but the present method is also applicable to the light sources with three or more laser arrays.

As indicated earlier, the positions for writing data with the plurality of laser beams onto recording substrate is controlled in a manner specified by the aforementioned $\theta \leq \tan^{-1}\{1/(n-1)\}$ relation. Therefore, beam scanning becomes feasible using a similar beam positioning and recording system to that utilized in the one beam scanning, thus minimizing the positioning error, but using conventional and fewer parts in its construction.

In addition, for the present light source apparatus, the use of complicated sensors and beam detection algorithm can be alleviated such as previously necessitated in the multibeam light source disclosed in Japanese Laid-Open Publication No. 9-251137, which may result in increased machine costs.

Further, in the multibeam light source according to the present embodiment, the optical axis of laser beams from the laser array 1B is aligned to approximately parallel to, yet being tilted by a relatively minute angle α from that of the laser array 1A.

As a result, the position of laser beam spots on the recording substrate, formed by the laser array 1B, is thereby adjusted to be displaced along the primary scanning direction by a predetermined distance Δ (FIG. 10) from that of beam spots from the laser array 1A.

Accordingly, laser beam scanning can be carried out for each of the laser arrays 1A and 1B, individually using a similar system of photodetector and control circuits to that utilized in the one beam scanning systems.

As a result, in beam scanning with the multibeam light source according to the present embodiment, the positioning error can be minimized, even using rather conventional, and fewer, parts in its construction. This is advantageous over the previous multibeam light sources such as those disclosed in the Japanese Laid-Open Publications Nos. 9-211350 and 9-1861, for which correction procedures on dot writing positions are necessitated.

With the multibeam light source according to the present embodiment, therefore, several improvements can be achieved, such as the increase in speed and density of the information recording, formation of a suitable laser beam diameter on recording substrates, and excellent recorded images without visually recognizable phase differences between laser beam spots.

It is apparent from the above description that the multibeam light sources disclosed herein have advantages over previous similar devices.

For example, using the multibeam light sources with the aforementioned adjusting means, the plurality laser spots are adjusted to be situated within the distance which is determined so as not to affect appreciably the recorded image quality.

As a result, by achieving suitable dot diameters even in higher speed recording, satisfactory recorded image quality may be obtained without relatively complicated correction processing steps and additional units therefor.

In addition, since the rotation of laser array for the adjustment may be carried out around the midpoint of the straight line which is drawn connecting the centers of the plurality of light emitting points, the deviation in the shape of the beam spots projected onto the recording substrate can be minimized with relative ease. As a result, the degradation of the recorded image quality can be prevented.

Also, by bringing the recorded dot density in the secondary scanning direction be 50 m at most, the plurality of laser beams are able to form higher dot densities without appreciable phase difference between the beams, to thereby result in satisfactory quality of recorded images.

These advantages of the multibeam light sources are realized not only for one laser array but also for a plurality of arrays, as well, as described earlier.

Further, for the case of two laser arrays, for example, the optical axis of laser beams from the second laser array is formed to be aligned to approximately parallel to, yet being tilted by a relatively minute angle from, that of the first laser array. The position of laser beam spots on the recording substrate, formed by the second laser array, is thereby adjusted to be displaced along the primary scanning direction by a predetermined distance from that of beam spots from the first laser array.

As a result, further increases in speed and density of the information recording are feasible, through the formation of a suitable laser beam diameter on recording substrates, and excellent recorded images are feasible without visually recognizable phase differences between laser beam spots. In addition, the positioning error in recording steps can be minimized, even using rather conventional, and fewer, parts in its construction.

Numerous modifications and variations of the present invention are possible in light of the above teachings. For example, features described for certain embodiments may be combined with other embodiments described herein. It is therefore to be understood that within the scope of the appended claims, the invention may be practiced otherwise than as specifically described herein.

What is claimed as new and desired to be secured by Letters Patent of the United States is:

1. A method of adjusting alignment of light beams in a multibeam light source, said method comprising:

emitting light from a plurality of light emitting points in a semiconductor laser array, said plurality of light emitting points positioned in linear relationship to one another and having an equidistant pitch so as to respectively emit the light beams simultaneously scanned over a recording substrate;

first rotating the semiconductor laser array with respect to a collimator lens to a first alignment position so that each of the light emitting points in the plurality of light emitting points is generally aligned in a secondary scanning direction of the recording substrate;

retaining the semiconductor laser array in the first alignment position with respect to the collimator lens using an ultraviolet curing adhesive resin to fix the collimator lens after the first rotating;

second rotating the semiconductor laser array with respect to a bracket with tapped screw holes to a second alignment position so as to satisfy the relation $\theta \leq \tan^{-1}\{1/(n-1)\}$, where angle $\theta$ is defined by first and second straight lines on the recording substrate, said first straight line drawn perpendicular to a primary scanning direction and said second straight line drawn through respective centers of a first and an n-th light beam spot formed by the light beams emitted respectively from said plurality of light emitting points; and retaining the semiconductor laser array in the second alignment position with respect to the bracket by tightening screws through the tapped screw holes after the second rotating.

* * * * *